Patented Feb. 22, 1949

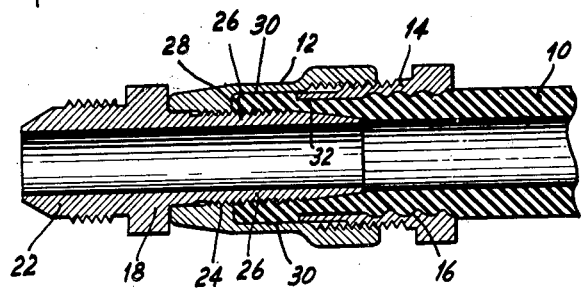
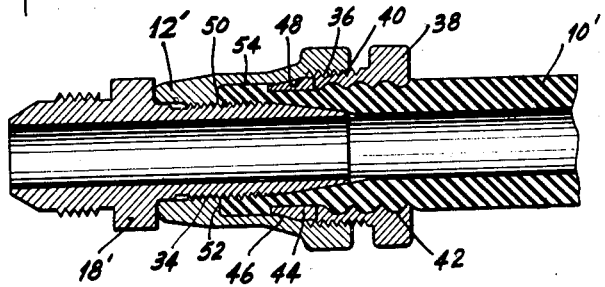

2,462,323

UNITED STATES PATENT OFFICE 2,462,323

DETACHABLE HOSE FITTING

Peter F. Hurst, Horton, Mich., assignor, by mesne assignments, to Aeroquip Corporation, Jackson, Mich., a corporation of Michigan Application March 12, 1945, Serial No. 582,356

5 Claims. (Cl. 285—86)

The present invention relates to improvements in detachable hose fittings.

One of the objects of the present invention is to provide detachable hose fittings capable of being employed in connection with high pressure hose, being an improvement of the type of construction disclosed in United States Letters Patent No. 2,219,218 granted October 22, 1940.

Another object is to provide a detachable hose fitting in which a greater sealing pressure between the component parts and the hose fittings may be obtained, giving effective sealing action under high pressures.

Another object of the invention is to provide detachable hose fittings of the type shown in the aforesaid patent having a recessed portion of adjustable area into which the end of the hose is forced at the time of assembly.

A further object of the invention is to provide a detachable hose fitting in which the socket portion is of multipart construction affording relative axial displacement between the component parts.

These and other objects and advantages residing in the combination, construction and arrangement of parts will be more fully appreciated from the following specification and claims.

In the drawings, wherein two different embodiments of the present invention are disclosed, Fig. 1 is a vertical cross-sectional view through a detachable hose fitting and hose assembly embodying the present invention, and Fig. 2 is a view similar to Fig. 1 of a slightly modified form of the invention illustrated in Fig. 1.

Referring to the drawing, in Fig. 1 a flexible hose 10 is shown screwed to a two-part socket, consisting of a main female portion 12 and a male portion 14, the latter being provided at 16 with lefthand threads. The nipple 18 is shown with threaded male portions 20 and 22, the portion 20 engaging with a correspondingly threaded portion 24.

To assemble the construction shown in Fig. 1, with the nipple 18 removed, and the male portion 14 of the socket only partially threaded into the ferrule portion 12, the hose is screwed into the two-part socket with the assistance of the lefthand thread 16 until the end 26 of the hose 10 abuts the wall 28 of the recess 30. The nipple 18 is then threaded into the portion 12, as shown in Fig. 1. Such insertion of the nipple 18 into the hose 10 tightly compresses the hose into the recess 30. Thereafter even higher compression in the recess 30 may be obtained by screwing the socket portion 14 further into the portion 12, the end 32 actually functioning as a movable end wall portion of the structure defining the recess 30.

In the modification shown in Fig. 2, the socket is of three-part construction comprising a female portion 12' internally threaded at 34 and 36, a male portion 38 externally threaded at 40 and internally threaded at 42 with a coarse lefthand thread, and a split ring 44 having a conical nose 46 adapted to act along a conical wall 48 of the portion 12'. The nipple 18' may correspond to that shown in Fig. 1.

To assemble the fitting of Fig. 2 on the hose 10', the male portion 38 is only partially threaded into the female portion 12' of the socket and the ring 44 is fully expanded within the limits of the internal diameter of the thread 36. The hose 10' is then threaded into the socket parts 12' and 38 to bring the end 50 of the hose 10' against the wall 52 of the recess 54. The nipple 18 is then screwed into the multipart socket in the portion shown in Fig. 2, compressing the hose 10' into the recess 54. To increase the compression of the hose 10' within the recess 54, the portion 38 is threaded further into the portion 12' advancing the split ring 44 and contracting the same through engagement with the conical wall 48. With this construction it should be apparent that high compression of the hose within the recess 54 is made possible.

Having thus described my invention, what I desire to secure by Letters Patent and claim is:

1. A detachable hose fitting comprising a nipple, a socket having a female part and a male part, an interiorly threaded bore in said female part of one diameter into which said nipple is threaded, an internally threaded bore in said female part of a larger diameter into which the male part is threaded, a recess in said female part between said internally threaded bores defining a chamber embracing a portion of said nipple when assembled in said socket and closed at one end by an annular wall of said wall socket part, and into which chamber the end of the hose is inserted to fill the chamber, said male part being internally threaded to provide said socket with a threaded bore portion axially spaced from said chamber to facilitate the insertion of the hose into the socket, and means between said chamber and said threaded bore portion projecting into the end of said chamber remote from said annular wall to provide an axially movable wall for compressing the hose to completely fill said chamber.

2. A detachable hose fitting for flexible hose lines comprising tubular socket means into which the hose is inserted, a nipple insertable into said socket means from one end and having a tapered end for entering the end of the hose to compress the same to fill an annular space defined between the nipple and the socket, said means including a part embracing the hose and projecting into said socket from the other end, said part presenting an annular axially movable wall to the portion of the hose compressed by said nipple adjacent the root of said tapered end, and a threaded connection between said means and socket for advancing said part, said part being internally threaded to provide said socket means, with a threaded bore portion to facilitate the insertion of the hose.

3. A detachable hose fitting as claimed in claim 1 in which said means projecting into the end of said chamber to provide an axially movable wall is constituted by an end extension of said male socket part.

4. A detachable hose fitting as claimed in claim 1 in which said means projecting into the end of said chamber to provide an axially movable wall is constituted by a split ring co-extensive with the end of the male socket part adjacent said chamber.

5. A detachable hose fitting comprising a nipple having an externally screw-threaded portion, a female socket part having an internally screw-threaded bore portion of a smaller diameter engaged with said externally screw-threaded nipple portion and an internally screw-threaded portion of a larger diameter axially spaced from said smaller diameter female socket portion and joined to the said smaller diameter portion by a radial wall, the nipple and the female socket part being co-axial with each other and forming between them an annular space which is filled by the end portion of the hose and one end of which annular space is closed by said radial wall and a male socket part co-axial with said nipple and female socket part and having an internally threaded bore for engagement with the hose and with an externally screw-threaded portion for engagement with said larger diameter screw threaded portion of the female socket part, the said male socket part presenting an axially adjustable end wall axially spaced from and opposite said radial wall on the female socket part and engaged with the hose compressed into said annular space.

PETER F. HURST.

REFERENCES CITED

The following references are of record in the file of this patent:

UNITED STATES PATENTS

| Number | Name | Date |
|---|---|---|
| 1,130,473 | Brown | Mar. 2, 1915 |
| 1,157,997 | Meeks | Oct. 26, 1915 |
| 2,360,761 | Clickner | Oct. 17, 1944 |